United States Patent
Li

(10) Patent No.: US 10,674,549 B2
(45) Date of Patent: Jun. 2, 2020

(54) METHOD AND APPARATUS FOR NETWORKING UNMANNED AERIAL VEHICLE AND SYSTEM FOR CONTROLLING UNMANNED AERIAL VEHICLE

(71) Applicant: AUTEL ROBOTICS CO., LTD., Shenzhen, Guangdong (CN)

(72) Inventor: Kui Li, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 93 days.

(21) Appl. No.: 15/877,944

(22) Filed: Jan. 23, 2018

(65) Prior Publication Data
US 2018/0152982 A1 May 31, 2018

Related U.S. Application Data

(63) Continuation of application No. PCT/CN2016/090166, filed on Jul. 15, 2016.

(30) Foreign Application Priority Data

Jul. 24, 2015 (CN) .......................... 2015 1 0444663

(51) Int. Cl.
G06F 15/16 (2006.01)
H04W 76/11 (2018.01)
(Continued)

(52) U.S. Cl.
CPC .......... *H04W 76/11* (2018.02); *H04W 12/003* (2019.01); *H04W 12/06* (2013.01);
(Continued)

(58) Field of Classification Search
CPC ... H04W 76/10; H04W 76/11; H04W 12/003; H04W 12/06; H04W 12/08; H04W 4/80;
(Continued)

(56) References Cited

U.S. PATENT DOCUMENTS 8,477,747 B1 * 7/2013 Sobel ................... H04W 12/08
370/338
10,205,776 B2 * 2/2019 Liang ................... H04W 12/06
(Continued)

FOREIGN PATENT DOCUMENTS

CN 103096506 A 5/2013
CN 103685468 A 3/2014
(Continued)

OTHER PUBLICATIONS

Connectivity of the Internet of Things, Nov. 28, 2016 1:19:25 PM / by Brittney Borowicz. 14 pages.*
(Continued)

*Primary Examiner* — Richard G Keehn

(57) ABSTRACT

The present application provides a method and an apparatus for networking an unmanned aerial vehicle and a system for controlling an unmanned aerial vehicle. The method for networking an unmanned aerial vehicle includes: generating a service set identifier and a password; sending the generated service set identifier and password to a control end by means of short-distance wireless communication; judging the status of a connection to the control end; when the connection is disconnected, returning to the step of generating a service set identifier and a password, where the service set identifier and the password that are generated each time are both different from the previously generated service set identifier and password; and when the connection is not disconnected, continuing to judge the status of the connection to the control end.

8 Claims, 3 Drawing Sheets

(51) Int. Cl.
*H04W 76/10* (2018.01)
*H04W 12/00* (2009.01)
*H04W 12/06* (2009.01)
*H04W 12/08* (2009.01)
*H04W 4/80* (2018.01)
*G05D 1/00* (2006.01)
*G05D 1/10* (2006.01)
*H04W 84/12* (2009.01)

(52) U.S. Cl.
CPC .......... *H04W 12/08* (2013.01); *H04W 76/10* (2018.02); *G05D 1/0022* (2013.01); *G05D 1/101* (2013.01); *H04L 2463/081* (2013.01); *H04W 4/80* (2018.02); *H04W 84/12* (2013.01)

(58) Field of Classification Search
CPC . H04W 84/12; H04L 2463/081; G05D 1/101; G05D 1/0022
See application file for complete search history.

(56) References Cited

U.S. PATENT DOCUMENTS

| | | | | |
|---|---|---|---|---|
| 10,321,501 | B2* | 6/2019 | Liu | H04B 5/02 |
| 2005/0135236 | A1* | 6/2005 | Benson | H04L 41/0816 370/225 |
| 2010/0027775 | A1* | 2/2010 | I'Anson | H04M 1/274575 379/202.01 |
| 2011/0243112 | A1* | 10/2011 | Misumi | H04W 76/10 370/338 |
| 2011/0264730 | A1* | 10/2011 | Dattagupta | H04L 12/2809 709/203 |
| 2014/0099853 | A1* | 4/2014 | Condon | A63H 13/00 446/37 |
| 2014/0162598 | A1* | 6/2014 | Villa-Real | H04M 1/66 455/411 |
| 2015/0193183 | A1 | 7/2015 | Ichikawa et al. | |
| 2015/0316927 | A1* | 11/2015 | Kim | G03B 15/006 701/2 |
| 2016/0139596 | A1* | 5/2016 | Na | G08C 17/02 701/2 |
| 2016/0143028 | A1* | 5/2016 | Mancuso | H04L 63/20 370/338 |
| 2016/0241541 | A1* | 8/2016 | Soelberg | H04W 4/70 |
| 2016/0286343 | A1* | 9/2016 | Terashita | H04W 4/80 |
| 2016/0360087 | A1* | 12/2016 | Kwon | H04N 5/23229 |
| 2018/0049257 | A1* | 2/2018 | Liu | H04B 5/02 |
| 2018/0077022 | A1* | 3/2018 | Van Oost | H04L 63/0876 |
| 2018/0288673 | A1* | 10/2018 | Henderson | H04W 12/08 |

FOREIGN PATENT DOCUMENTS

| | | |
|---|---|---|
| CN | 104580401 A | 4/2015 |
| KR | 1020100079341 A | 7/2010 |

OTHER PUBLICATIONS

The International Search Report dated Sep. 27, 2016, PCT/CN2016/090166.
Supplementary European Search Report dated May 9, 2018; Appln. No. EP 16 82 9763.

* cited by examiner

METHOD AND APPARATUS FOR NETWORKING UNMANNED AERIAL VEHICLE AND SYSTEM FOR CONTROLLING UNMANNED AERIAL VEHICLE

CROSS-REFERENCE

This application is a continuation application of International Application No. PCT/CN2016/090166, filed on Jul. 15, 2016, which claims priority of Chinese Patent Application No. 201510444663.7, filed on Jul. 24, 2015, which is incorporated herein by reference in its entirety.

BACKGROUND

Technical Field

The present application relates to the field of control technologies of unmanned aerial vehicles, and specifically, to a method and an apparatus for networking an unmanned aerial vehicle and a system for controlling an unmanned aerial vehicle.

RELATED ART

In the field of control over unmanned aerial vehicles, a control end may communicate with an unmanned aerial vehicle by using a wireless local area network. When a wireless local area network is used for communication, an unmanned aerial vehicle is usually used as a wireless access point (AP), and another terminal (such as a control end or a camera apparatus) is used as a connection station (station).

In the process of implementing the present application, the applicant finds that the related technology has the following problems: In the existing system for controlling an unmanned aerial vehicle, a service set identifier (SSID) and a password are manually set, the unmanned aerial vehicle broadcasts the SSID, and after the SSID is found by a control end, the password is manually entered to implement networking; operation of such a networking process is complex; the SSID needs to be manually set, and a duplicate name easily occurs; moreover, manual identification is needed during networking, and the manually set password has a leakage risk, and the security of the manually set password is relatively poor.

SUMMARY

Therefore, the technical problems to be resolved by the present application are to improve the efficiency of networking operations, reduce manual operations, and improve the security of the networking operations.

The present application provides a method for networking an unmanned aerial vehicle, including: generating a service set identifier and a password; sending the generated service set identifier and password to a control end by means of short-distance wireless communication; judging the status of a connection to the control end; when the connection is disconnected, returning to the step of generating a service set identifier and a password; and when the connection is not disconnected, continuing to judge the status of the connection to the control end.

The present application further provides another method for networking an unmanned aerial vehicle, including: receiving, by means of short-distance wireless communication, a service set identifier and a password that are generated by the unmanned aerial vehicle; networking the unmanned aerial vehicle by using the currently received service set identifier and password; and after a connection is disconnected, receiving, by means of short-distance wireless communication, a service set identifier and a password that are regenerated by the unmanned aerial vehicle, and networking the unmanned aerial vehicle by using the regenerated service set identifier and password.

Correspondingly, the present application provides an apparatus for networking an unmanned aerial vehicle, including: a generation unit, configured to generate a service set identifier and a password; a sending unit, configured to send the generated service set identifier and password to a control end by means of short-distance wireless communication; a judgment unit, configured to judge the status of a connection to the control end; a first execution unit, configured to start the generation unit when the connection is disconnected; and a second execution unit, configured to start the judgment unit when the connection is not disconnected.

The present application further provides another apparatus for networking an unmanned aerial vehicle, including: a receiving unit, configured to receive, by means of short-distance wireless communication, a service set identifier and a password that are sent by the unmanned aerial vehicle; a connection unit, configured to network the unmanned aerial vehicle by using the service set identifier and the password; and an execution unit, configured to: when a connection is disconnected, start the receiving unit to receive, by means of short-distance wireless communication, a service set identifier and a password that are regenerated by the unmanned aerial vehicle, and start the connection unit to network the unmanned aerial vehicle by using the regenerated service set identifier and password.

The present application further provides a system for controlling an unmanned aerial vehicle, including an unmanned aerial vehicle and a control end, where the unmanned aerial vehicle is configured to: generate a service set identifier and a password, and send the service set identifier and the password to the control end by means of short-distance wireless communication; the control end is configured to: receive, by means of short-distance wireless communication, the service set identifier and the password that are sent by the unmanned aerial vehicle, and network the unmanned aerial vehicle by using the currently received service set identifier and password; the unmanned aerial vehicle is further configured to: judge the status of a connection to the control end; when the connection is disconnected, regenerate a service set identifier and a password, and send the regenerated service set identifier and password to the control end; and when the connection is not disconnected, continue to judge the status of the connection to the control end; and the control end is further configured to: when the connection is disconnected, re-receive, by means of short-distance wireless communication, the service set identifier and the password that are regenerated by the unmanned aerial vehicle, and network the unmanned aerial vehicle by using the regenerated service set identifier and password.

Optionally, the service set identifier and the password that are regenerated by the unmanned aerial vehicle each time are both different from the previously generated service set identifier and password.

Optionally, the foregoing short-distance wireless communication includes near field communication, radio frequency identification and Bluetooth communication.

As compared with the prior art, a service set identifier and a password are generated by an unmanned aerial vehicle, and the service set identifier and the password are sent to a control end by means of short-distance wireless communication, so that manual operations can be reduced, and the efficiency of networking operations can be improved. Moreover, the unmanned aerial vehicle does not broadcast the service set identifier, and the password does not need to be displayed, manually set, or entered in the control end. Therefore, the security of the networking operations can be improved.

BRIEF DESCRIPTION OF THE DRAWINGS

To make the content of the present application more clearly and easily understood, the following further describes the present application in detail according to specific embodiments of the present application with reference to the accompanying drawings, where.

DETAILED DESCRIPTION

A method for networking an unmanned aerial vehicle provided in the present application may be applied to a system for controlling an unmanned aerial vehicle. The system for controlling an unmanned aerial vehicle usually includes a control end 11 and an unmanned aerial vehicle 12. The control end 11 is configured to send a control instruction to the unmanned aerial vehicle 12, and the unmanned aerial vehicle 12 may send status information to the control end 11. The control end 11 may communicate with the unmanned aerial vehicle 12 in a plurality of manners, for example, by using a wireless local area network. When the two ends use the wireless local area network, one of them first needs to establish a subnetwork, which needs independent authentication. Only a user who passes the authentication can enter the subnetwork.

Figure 1:
FIG. 1 is a schematic diagram of an application scenario of a method for networking an unmanned aerial vehicle according to an embodiment of the present application.

An embodiment of the present application provides a method for networking an unmanned aerial vehicle. The method is applied to the end of the unmanned aerial vehicle of the foregoing system for controlling an unmanned aerial vehicle. As shown in FIG. 1, the method includes:

S11: An unmanned aerial vehicle establishes a subnetwork, and generates a service set identifier and a password. For example, the unmanned aerial vehicle may generate the service set identifier and the password after receiving a switch-on command or a connection command. The service set identifier and the password may be fixed values generated according to a hardware MAC address, or may be variable random values.

S12: Make the unmanned aerial vehicle and a control end close to each other, and send the generated service set identifier and password to the control end by means of short-distance wireless communication. The short-distance wireless communication may be performed in a plurality of manners, such as near field communication (NFC), radio frequency identification (RFID), Bluetooth communication, and wireless fidelity (WIFI). In this embodiment, the short-distance wireless communication is optionally a point to point mode of the NFC. Specifically, the unmanned aerial vehicle enables an NFC communication function to enter the point to point mode, and monitors whether the control end enters an effective communication distance. When the control end enters the effective distance, the unmanned aerial vehicle sends the service set identifier and the password to the control end. After receiving the service set identifier and the password, the control end networks the unmanned aerial vehicle by using the information, and then the control end and the unmanned aerial vehicle keep a networking status.

S13: Judge the status of a connection to the control end. During actual application, there is a plurality of factors, such as factors like an excessively long distance and a manual operation, which may cause the connection between the unmanned aerial vehicle and the control end to be disconnected. When the connection is disconnected, the step S11 is returned to. That is, after the connection is disconnected each time, the unmanned aerial vehicle regenerates a service set identifier and a password, and makes the unmanned aerial vehicle and the control end close to each other again, and sends the service set identifier and the password that are generated most recently to the control end by means of short-distance wireless communication. If the connection is not disconnected, the networking status is kept, and the status of the connection is continuously judged. Optionally, the service set identifier and the password that are regenerated by the unmanned aerial vehicle each time are both different from the previously generated service set identifier and password. In this way, dynamic updating of the service set identifier and the password can be kept, thereby further improving the security of the networking operations. In addition, a person skilled in the art can understand that to make the networking operations more flexible, the foregoing service set identifier and password may alternatively be manually set.

According to the method for networking an unmanned aerial vehicle according to this embodiment of the present application, a service set identifier and a password are generated by an unmanned aerial vehicle, so that manual operations can be reduced, the efficiency of networking operations can be improved, and the possibility that a same service set identifier occurs to a plurality of unmanned aerial vehicles can be reduced. The service set identifier and the password are sent to a control end by means of short-distance wireless communication, the service set identifier is not broadcast, and the password does not need to be displayed or manually set, so that the security of the networking operations can be improved.

Figure 2:
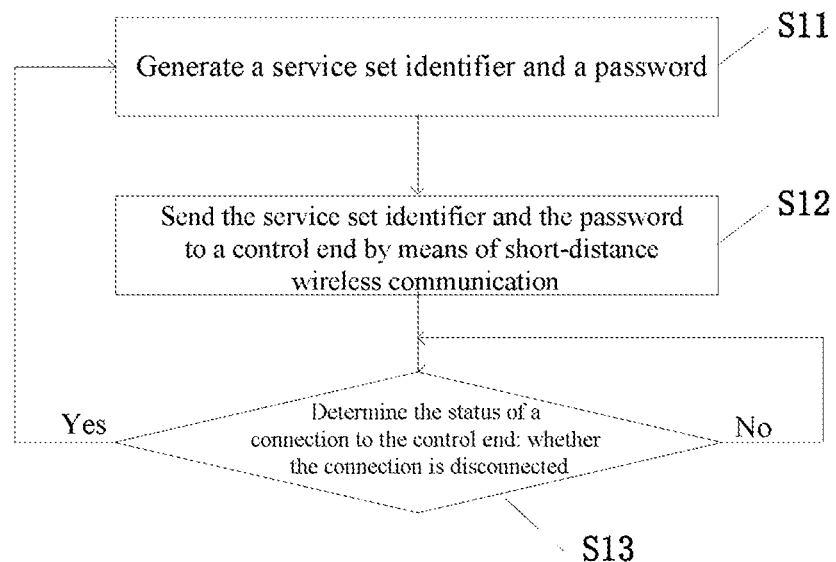
FIG. 2 is a flowchart of a method for networking an unmanned aerial vehicle according to an embodiment of the present application.

Corresponding to the previous embodiment, another embodiment of the present application further provides an apparatus for networking an unmanned aerial vehicle. The apparatus may be applied to the foregoing unmanned aerial vehicle. As shown in FIG. 2, the apparatus includes:

a generation unit 21, configured to generate a service set identifier and a password;

a sending unit 22, configured to send the service set identifier and the password to a control end by means of short-distance wireless communication. As stated above, the short-distance wireless communication includes near field communication, radio frequency identification and Bluetooth communication;

a judgment unit 23, configured to judge the status of a connection to the control end;

a first execution unit 24, configured to start the generation unit 21 when the connection is disconnected, where optionally, the service set identifier and the password that are generated each time are both different from the previously generated service set identifier and password; and a second execution unit 25, configured to start the judgment unit 23 when the connection is not disconnected.

According to the apparatus for networking an unmanned aerial vehicle according to this embodiment of the present application, a service set identifier and a password are generated by an unmanned aerial vehicle, so that manual operations can be reduced, the efficiency of networking operations can be improved, and the possibility that a same service set identifier occurs to a plurality of unmanned aerial vehicles can be reduced. The service set identifier and the password are sent to a control end by means of short-distance wireless communication, the service set identifier is not broadcast, and the password does not need to be displayed or manually set, so that the security of the networking operations can be improved.

Figure 3:
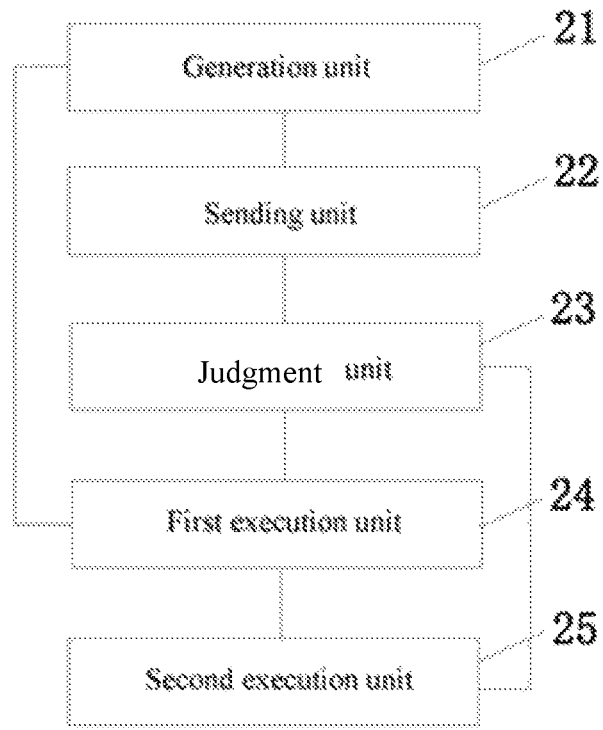
FIG. 3 is a structural diagram of an apparatus for networking an unmanned aerial vehicle according to an embodiment of the present application.

Another embodiment of the present application further provides a method for networking an unmanned aerial vehicle. The method is applied to the control end of the foregoing system for controlling an unmanned aerial vehicle. As shown in FIG. 3, the method includes:

S21: Receive, by means of short-distance wireless communication, a service set identifier and a password that are sent by an unmanned aerial vehicle. As stated above, in this embodiment, the short-distance wireless communication is optionally a point to point mode of NFC. Specifically, the control end enables an NFC communication function to enter the point to point mode, and monitors whether the sending end enters an effective communication distance. When the unmanned aerial vehicle enters the effective distance, the control end receives the service set identifier and the password that are sent by the unmanned aerial vehicle.

S22: Network the unmanned aerial vehicle by using the currently received service set identifier and password, and join a subnetwork established by the unmanned aerial vehicle.

S23: After a connection is disconnected, receive, by means of short-distance wireless communication, a service set identifier and a password that are regenerated by the unmanned aerial vehicle, and network the unmanned aerial vehicle by using the regenerated service set identifier and password.

If the service set identifier and the password that are generated by the unmanned aerial vehicle after networking is disconnected each time are the same with the previous ones, that is, dynamic updating is not performed, the control end may record the service set identifier and the password that are received at the first time, and after the connection is disconnected, the control end may not re-receive the service set identifier and the password, and directly use the recorded service set identifier and password to connect to the unmanned aerial vehicle.

As stated above, the service set identifier and the password that are regenerated by the unmanned aerial vehicle each time may be different from the previously generated service set identifier and password. Therefore, after the networking is disconnected each time, the service set identifier and the password that are re-received by the control end are different from the previous ones. Therefore, dynamic updating can be kept, to further improve the security of networking operations.

According to the method for networking an unmanned aerial vehicle according to this embodiment of the present application, a service set identifier and a password that are sent by an unmanned aerial vehicle by means of near field communication are received for networking the unmanned aerial vehicle, so that manual operations can be reduced and the efficiency of networking operations can be improved. In particular, when a plurality of unmanned aerial vehicles exists in a same local area network, during networking according to this method, service set identifiers do not need to be manually distinguished from each other, and passwords do not need to be manually distinguished from each other. In addition, in the process of networking, the service set identifier does not need to be broadcast, and the password does not need to be displayed or manually set, so that the security of the networking operations can be improved.

Figure 4:
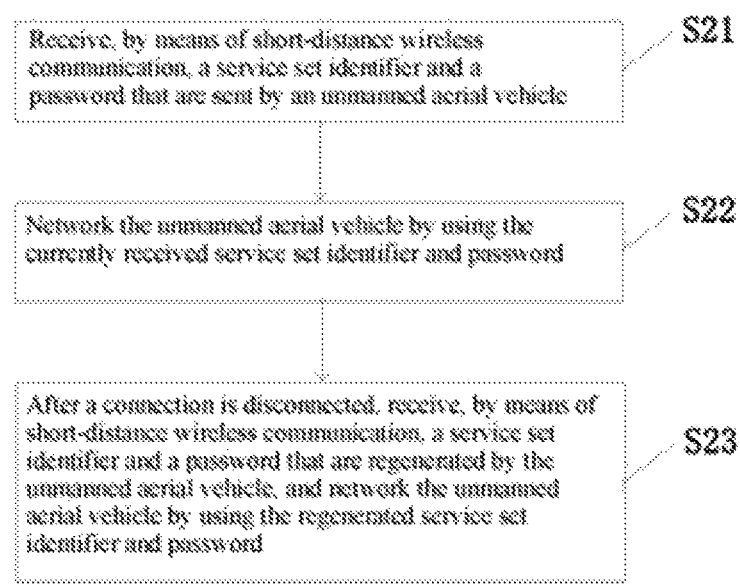
FIG. 4 is a flowchart of another method for networking an unmanned aerial vehicle according to an embodiment of the present application.
Figure 5:
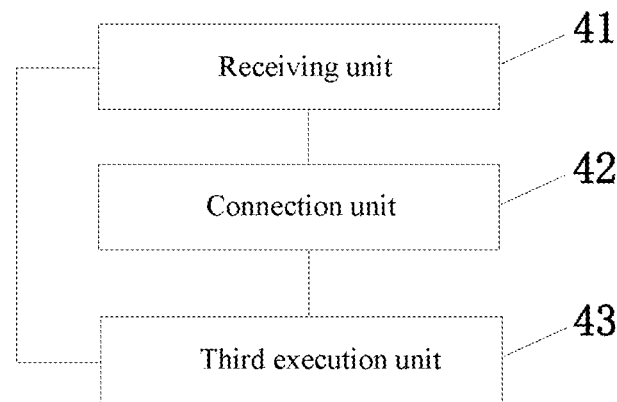
FIG. 5 is a structural diagram of another apparatus for networking an unmanned aerial vehicle according to an embodiment of the present application.

Corresponding to the previous embodiment, another embodiment of the present application further provides an apparatus for networking an unmanned aerial vehicle. The apparatus may be disposed in the foregoing control end. As shown in FIG. 4, the apparatus includes:

a receiving unit 41, configured to receive, by means of short-distance wireless communication, a service set identifier and a password that are sent by the unmanned aerial vehicle, where as stated above, the short-distance wireless communication includes near field communication, radio frequency identification and Bluetooth communication;

a connection unit 42, configured to network the unmanned aerial vehicle by using the service set identifier and the password; and a third execution unit 43, configured to start the receiving unit 41 when a connection is disconnected. Optionally, the service set identifier and the password that are generated by the unmanned aerial vehicle each time are both different from the previously generated service set identifier and password.

According to the apparatus for networking an unmanned aerial vehicle according to this embodiment of the present application, a service set identifier and a password that are sent by an unmanned aerial vehicle by means of NFC are received for networking the unmanned aerial vehicle, so that manual operations can be reduced and the efficiency of networking operations can be improved. In particular, when a plurality of unmanned aerial vehicles exists in a same local area network, during networking according to this method, service set identifiers do not need to be manually distinguished from each other, and passwords do not need to be manually distinguished from each other. In addition, in the process of networking, the service set identifier does not need to be broadcast, and the password does not need to be displayed or manually set, so that the security of the networking operations can be improved.

Figure 6:
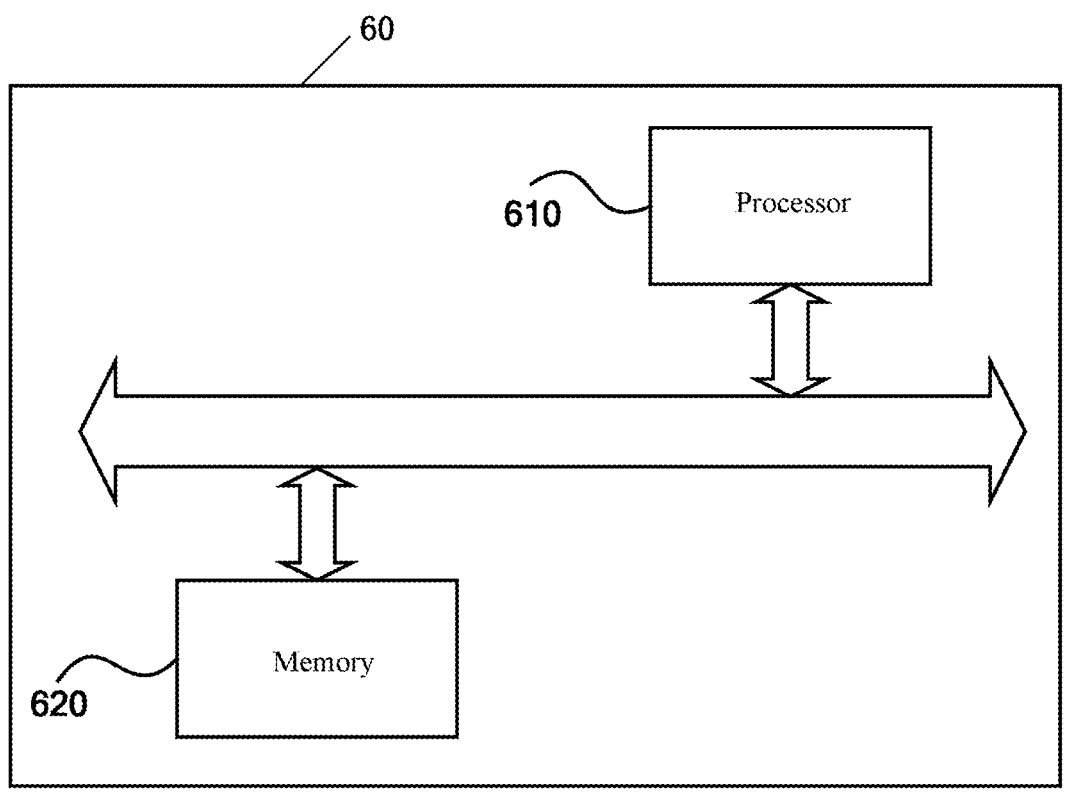
FIG. 6 is a schematic structural diagram of an electronic device according to another embodiment of the present application.

Referring to FIG. 6, FIG. 6 is a schematic structural diagram of hardware of an electronic device for performing a method for networking an unmanned aerial vehicle according to another embodiment of the present application. As shown in FIG. 6, the device includes:

one or more processors 610 and a memory 620, where only one processor 610 is used as an example in FIG. 6.

The processor 610, the memory 620, the input apparatus 630, and the output apparatus 640 may be connected by using a bus or in other manners. A connection by using a bus is used as an example in FIG. 4.

As a non-volatile computer readable storage medium, the memory 620 can be used to store non-volatile software programs, non-volatile computer executable programs and modules, for example, program instructions/modules corresponding to the method for controlling an unmanned aerial vehicle in the embodiments of the present application (for example, the receiving unit 31, the second execution unit 34, the judgment unit 32, and the first execution unit 33 that are shown in FIG. 3). The processor 610 executes various functional applications and data processing of a server, that is, implements the processing method of the list item operation in the foregoing method embodiments, by running the non-volatile software programs, instructions and modules that are stored in the memory 620.

The memory 620 may include a program storage area and a data storage area, where the program storage area may store an operating system and an application that is needed by at least one function; the data storage area may store data created according to use of the processing apparatus of the list item operation, and the like. In addition, the memory 620 may include a high-speed random access memory, or may also include a non-volatile memory such as at least one disk storage device, flash storage device, or another non-volatile solid-state storage device. In some embodiments, the memory 620 optionally includes memories that are remotely disposed with respect to the processor 610, and these remote memories may be connected, via a network, to the processing apparatus of the list item operation. Examples of the network include, but are not limited to, the Internet, an intranet, a local area network, a mobile communications network and a combination thereof.

The one or more modules are stored in the memory 620. When the one or more modules are executed by the one or more processors 610, the method for controlling an unmanned aerial vehicle in any of the foregoing method embodiments is performed.

The foregoing product can perform the method provided in the embodiments of the present application, and has corresponding functional modules for performing the method and beneficial effects. Reference may be made to the method provided in the embodiments of the present application for technical details that are not described in detail in this embodiment.

The electronic device in this embodiment of the present application exists in multiple forms, including but not limited to:

(1) Mobile communications device: such devices are characterized by having a mobile communication function, and primarily providing voice and data communication; terminals of this type include: a smartphone (for example, an iPhone), a multimedia mobile phone, a feature phone, a low-end mobile phone, and the like;

(2) Ultra mobile personal computer device: such devices are personal computers, which have computing and processing functions, and usually have the function of mobile Internet access; terminals of this type include: PDA, MID and UMPC devices, and the like, for example, an iPad;

(3) Portable entertainment device: such devices can display and play multimedia content; devices of this type include: an audio and video player (for example, an iPod), a handheld game console, an e-book, an intelligent toy and a portable in-vehicle navigation device;

(4) Server: a device that provides a computing service; a server includes a processor, a hard disk, a memory, a system bus, and the like; an architecture of a server is similar to a universal computer architecture. However, because a server needs to provide highly reliable services, requirements for the server are high in aspects of the processing capability, stability, reliability, security, extensibility and manageability; and (5) other electronic apparatuses having a data interaction function.

The apparatus embodiments described above are merely illustrative, and the units described as separate parts may or may not be physically separate, and the parts displayed as units may or may not be physical units, may be located at one position, or may be distributed on a plurality of network units. Some or all of the modules may be selected according to actual needs to achieve the objective of the solution of this embodiment.

By means of the description of the foregoing implementations, a person skilled in the art can clearly learn that the implementations may be implemented by means of software plus necessary general-purpose hardware platforms, and certainly, may alternatively be implemented by hardware. Based on such an understanding, the foregoing technical solutions essentially, or the part contributing to related technologies may be implemented in a form of a software product. The computer software product may be stored in a computer readable storage medium, such as ROM/RAM, a magnetic disk, or an optical disc, and includes several instructions for instructing a computer device (which may be a personal computer, a server, a network device, or the like) to perform the methods described in the embodiments or in some parts of the embodiments.

Finally, it should be noted that the above embodiments are used merely for describing the technical solutions of the present application, but are not intended to limit the present application. It should be understood by a person of ordinary skill in the art that although the present application has been described in detail with reference to the foregoing embodiments, modifications can still be made to the technical solutions disclosed in the foregoing embodiments, or equivalent replacements can still be made to some technical features in the technical solutions, as long as such modifications or replacements do not cause the essence of the corresponding technical solutions to depart from the spirit and scope of the technical solutions of the embodiments of the present application.

Another embodiment of the present application further provides a system for controlling an unmanned aerial vehicle. Returning to FIG. 1, the system includes an unmanned aerial vehicle 12 and a control end 11, where the unmanned aerial vehicle 12 is configured to: generate a service set identifier and a password, and send the service set identifier and the password to the control end 11 by means of short-distance wireless communication;

the control end 11 is configured to: receive, by means of short-distance wireless communication, the service set identifier and the password that are sent by the unmanned aerial vehicle 12 and network the unmanned aerial vehicle 12 by using the currently received service set identifier and password;

the unmanned aerial vehicle 12 is further configured to: judge the status of a connection to the control end 11; when the connection is disconnected, regenerate a service set identifier and a password, and send the regenerated service set identifier and password to the control end 11, and when the connection is not disconnected, continue to judge the status of the connection to the control end 11; and the control end 11 is further configured to: when the connection is disconnected, re-receive, by means of short-distance wireless communication, the service set identifier and the password that are regenerated by the unmanned aerial vehicle 12, and network the unmanned aerial vehicle 12 by using the regenerated service set identifier and password.

As stated above, optionally, the service set identifier and the password that are regenerated by the unmanned aerial vehicle 12 each time are both different from the previously generated service set identifier and password. In this way, dynamic updating of the service set identifier and the password can be kept, thereby further improving the security of the networking operation.

As stated above, in this embodiment, the short-distance wireless communication is optionally a point to point mode of NFC. Specifically, the unmanned aerial vehicle 12 and the control end 11 both enable an NFC communication function to enter the point to point mode, and monitor whether a receiving end enters an effective communication distance. When the control end 11 and the unmanned aerial vehicle 12 get close to each other and enter the effective distance, the service set identifier and the password are transmitted.

According to the system for controlling an unmanned aerial vehicle according to this embodiment of the present application, a service set identifier and a password are generated by an unmanned aerial vehicle, and the service set identifier and the password are sent to a control end by means of short-distance wireless communication, so that manual operations can be reduced, and the efficiency of networking operations can be improved. Moreover, the unmanned aerial vehicle does not broadcast the service set identifier, and the password does not need to be displayed, manually set, or entered in the control end. Therefore, the security of the networking operations can be improved.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present application.

What is claimed is:

1. A system for controlling an unmanned aerial vehicle, comprising an unmanned aerial vehicle and a control end, wherein the unmanned aerial vehicle is configured to:
generate a service set identifier and a password after receiving a switching-on command or a connection command; and
monitor whether the control end enters an effective communication distance;
based on a determination that the control end enters the effective communication distance, send the service set identifier and the password to the control end by means of short-distance wireless communication;

the control end is configured to:
receive, by means of short-distance wireless communication, the service set identifier and the password that are sent by the unmanned aerial vehicle; and
network the unmanned aerial vehicle by using the currently received service set identifier and password.

2. The system according to claim 1, wherein the unmanned aerial vehicle is further configured to:
judge the status of a connection to the control end;
when the connection is disconnected, regenerate a service set identifier and a password, and send the regenerated service set identifier and password to the control end; and
when the connection is not disconnected, continue to judge the status of the connection to the control end.

3. The system for controlling an unmanned aerial vehicle according to claim 2, wherein the control end is further configured to:
when the connection is disconnected, re-receive, by means of short-distance wireless communication, the service set identifier and the password that are regenerated by the unmanned aerial vehicle, and network the unmanned aerial vehicle by using the regenerated service set identifier and password.

4. The system for controlling an unmanned aerial vehicle according to claim 1, wherein a service set identifier and a password that are regenerated by the unmanned aerial vehicle each time are both different from the previously generated service set identifier and password.

5. The system for controlling an unmanned aerial vehicle according to claim 1, wherein the short-distance wireless communication comprises any one of near field communication, radio frequency identification and Bluetooth communication.

6. The system for controlling an unmanned aerial vehicle according to claim 1, wherein the unmanned aerial vehicle is further configured to:
establish a subnetwork, which needs independent authentication only a control end who passes the authentication can enter the subnetwork.

7. The system for controlling an unmanned aerial vehicle according to claim 1, wherein the control end is further configured to: establish a subnetwork, which needs independent authentication, only an unmanned aerial vehicle who passes the authentication can enter the subnetwork.

8. The system for controlling an unmanned aerial vehicle according to claim 1, wherein the control end is further configured to:
judging whether a service set identifier and a password that are regenerated each time are the same as the previously generated,
when the two are the same, record the service set identifier and the password that are received at the first time, and after the connection is disconnected, the control end will not re-receive the service set identifier and the password, and directly use the recorded service set identifier and password to connect to the unmanned aerial vehicle.

* * * * *